(12) United States Patent
Krishnamurthy et al.

(10) Patent No.: US 10,372,112 B2
(45) Date of Patent: Aug. 6, 2019

(54) SYSTEM AND METHOD FOR LEGACY LEVEL 1 CONTROLLER VIRTUALIZATION

(71) Applicant: Honeywell International, Inc., Morris Plains, NJ (US)

(72) Inventors: Ananthapadmanabha Krishnamurthy, Bangalore (IN); Shylaja Munihanumaiah, Bangalore (IN); Elliott Rachlin, Scottsdale, AZ (US); Paul F. McLaughlin, Ambler, PA (US)

(73) Assignee: Honeywell International Inc., Morris Plains, NJ (US)

( * ) Notice: Subject to any disclaimer, the term of this patent is extended or adjusted under 35 U.S.C. 154(b) by 389 days.

(21) Appl. No.: 15/182,497

(22) Filed: Jun. 14, 2016

(65) Prior Publication Data

US 2017/0357247 A1 Dec. 14, 2017

(51) Int. Cl.
  *G06F 9/44* (2018.01)
  *G05B 19/4155* (2006.01)
  *G06F 8/52* (2018.01)
  *G06F 9/455* (2018.01)

(52) U.S. Cl.
  CPC ........... *G05B 19/4155* (2013.01); *G06F 8/52* (2013.01); *G06F 9/455* (2013.01); *G05B 2219/33338* (2013.01)

(58) Field of Classification Search
  CPC .................................................. G05B 19/4155
  USPC ....................................................... 717/136
  See application file for complete search history.

(56) References Cited

U.S. PATENT DOCUMENTS

| 6,247,172 B1 | 6/2001 | Dunn et al. | |
| 6,578,193 B1 * | 6/2003 | Adams | G06F 9/3802 |
| | | | 712/E9.055 |
| 7,809,547 B2 * | 10/2010 | Guenthner | G06F 9/455 |
| | | | 703/26 |

(Continued)

FOREIGN PATENT DOCUMENTS

KR 101606803 B1 * 3/2016 .......... H04W 72/042

OTHER PUBLICATIONS

International Search Report and Written Opinion of the International Searching Authority for International Application No. PCT/US2017/036426 dated Oct. 30, 2017, 12 pages.

(Continued)

*Primary Examiner* — Evral E Bodden
(74) *Attorney, Agent, or Firm* — Seager, Tufte & Wickhem LLP (57) ABSTRACT

A method includes translating at least one application source code file associated with a legacy controller in a distributed control system to instructions executable by a controller simulation computing device, wherein the legacy controller is associated with a legacy operating system and the controller simulation computing device is associated with a second operating system different from the legacy operating system. The method also includes simulating operation of the legacy controller using the instructions and an emulation of the legacy operating system in the controller simulation computing device. The method further includes determining configuration data for the legacy controller during the simulated operation of the legacy controller. In addition, the method includes saving the configuration data to a configuration data file.

20 Claims, 6 Drawing Sheets

(56) References Cited

U.S. PATENT DOCUMENTS

| | | | | |
|---|---|---|---|---|
| 2003/0046669 A1* | 3/2003 | Mohamed | ................. | G06F 8/52 |
| | | | | 717/136 |
| 2004/0133884 A1 | 7/2004 | Zemach et al. | | |
| 2008/0288928 A1* | 11/2008 | Bowers | .................... | G06F 8/41 |
| | | | | 717/136 |
| 2009/0089030 A1 | 4/2009 | Sturrock et al. | | |
| 2010/0058302 A1 | 3/2010 | Broscaru et al. | | |
| 2014/0152103 A1* | 6/2014 | Schauer | ................ | G06F 13/105 |
| | | | | 307/31 |
| 2017/0228225 A1* | 8/2017 | Rachlin | .................... | G06F 8/51 |

OTHER PUBLICATIONS

Elliott Rachlin, "Apparatus and Method for Managing a Plurality of Threads in an Operating System", U.S. Appl. No. 14/622,465, filed Feb. 13, 2015, 31 pages.

Elliott Rachlin, et al., System and Method for Facilitating Dynamic Remapping of Absolute Addresses During Software Migration, U.S. Appl. No. 15/176,108, filed Jun. 7, 2016, 30 pages.

* cited by examiner

SYSTEM AND METHOD FOR LEGACY LEVEL 1 CONTROLLER VIRTUALIZATION

TECHNICAL FIELD

This disclosure relates generally to distributed control systems. More specifically, this disclosure relates to a system and method for virtualization of a legacy Level 1 controller in a distributed control system.

BACKGROUND

Industrial process control and automation systems are often used to automate large and complex industrial processes, such as those in the chemical industry. These types of systems routinely include sensors, actuators, and controllers. The controllers typically receive measurements from the sensors and generate control signals for the actuators.

A distributed control system (DCS) is often implemented in conjunction with, or as part of, an industrial process control and automation system. A DCS often uses one or more Model predictive controllers (MPCs, also known as multivariable predictive controllers, or simply, multivariable controllers) in industrial processes to manage complex systems to operate at limits that are economically beneficial. Such MPCs, as well as other controllers in the DCS, may need to be configured before the controllers as implemented into a runtime DCS environment.

SUMMARY

This disclosure provides a system and method for virtualization of a legacy Level 1 controller in a distributed control system.

In a first embodiment, a method includes translating at least one application source code file associated with a legacy controller in a distributed control system to instructions executable by a controller simulation computing device, wherein the legacy controller is associated with a legacy operating system and the controller simulation computing device is associated with a second operating system different from the legacy operating system. The method also includes simulating operation of the legacy controller using the instructions and an emulation of the legacy operating system in the controller simulation computing device. The method further includes determining configuration data for the legacy controller during the simulated operation of the legacy controller. In addition, the method includes saving the configuration data to a configuration data file.

In a second embodiment, an apparatus includes at least one memory and at least one processor. The at least one memory is configured to store data. The at least one processing device is configured to translate at least one application source code file associated with a legacy controller in a distributed control system to instructions executable by the apparatus, wherein the legacy controller is associated with a legacy operating system and the apparatus is associated with a second operating system different from the legacy operating system. The at least one processing device is also configured to simulate operation of the legacy controller using the instructions and an emulation of the legacy operating system. The at least one processing device is further configured to determine configuration data for the legacy controller during the simulated operation of the legacy controller. In addition, the at least one processing device is configured to save the configuration data to a configuration data file stored in the at least one memory.

In a third embodiment, a non-transitory computer readable medium contains instructions that, when executed by at least one processing device, cause the at least one processing device to translate at least one application source code file associated with a legacy controller in a distributed control system to controller instructions executable by the at least one processing device, wherein the legacy controller is associated with a legacy operating system and the at least one processing device is associated with a second operating system different from the legacy operating system. The medium also contains instructions that, when executed by the at least one processing device, cause the at least one processing device to simulate operation of the legacy controller using the controller instructions and an emulation of the legacy operating system in the at least one processing device. The medium further contains instructions that, when executed by the at least one processing device, cause the at least one processing device to determine configuration data for the legacy controller during the simulated operation of the legacy controller. In addition, the medium contains instructions that, when executed by the at least one processing device, cause the at least one processing device to save the configuration data to a configuration data file.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
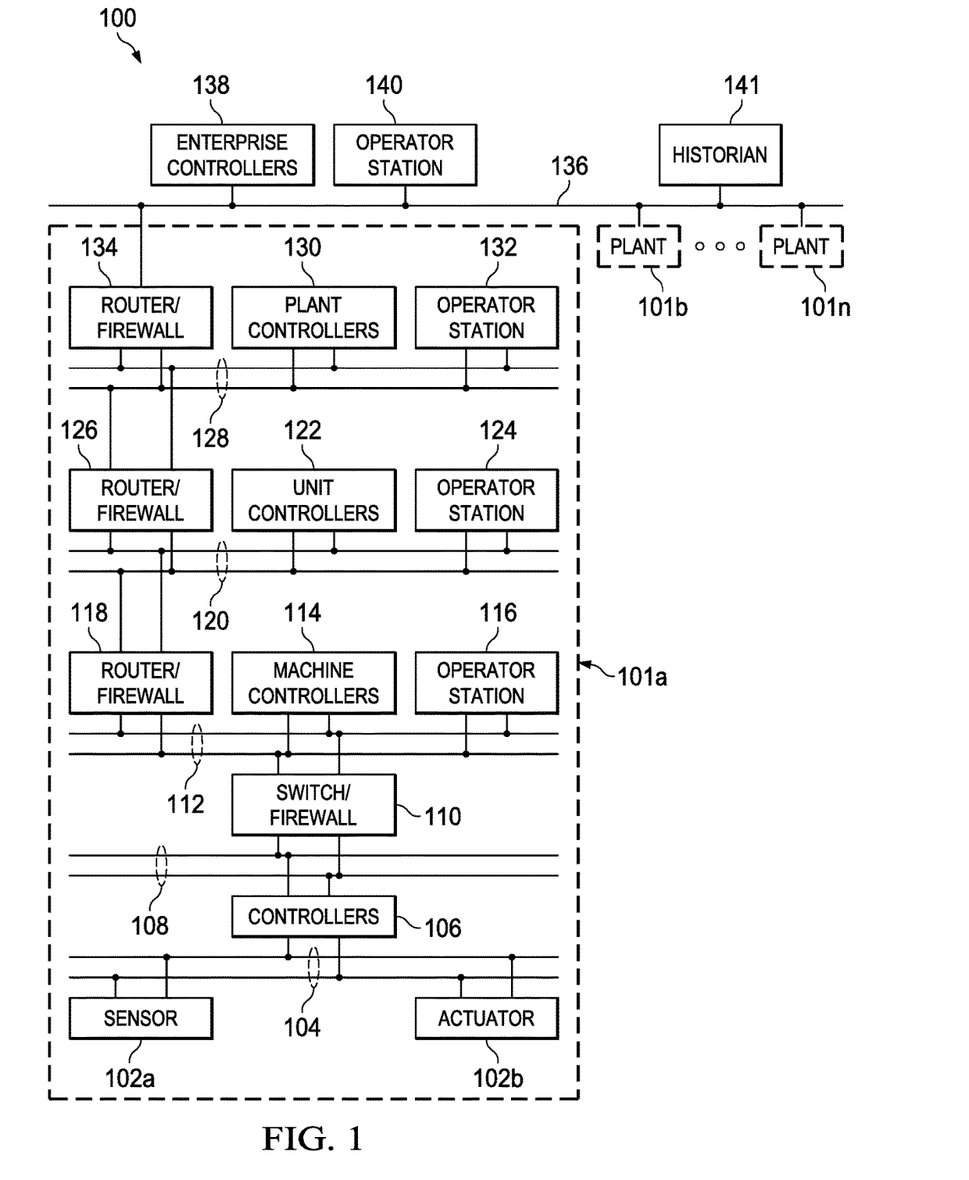
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various supervisory functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Additionally or alternatively, each controller 114 could represent a multivariable controller embedded in a Distributed Control System (DCS), such as a RMPCT controller or other type of controller implementing MPC or other APC. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/ firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Additionally or alternatively, each controller 122 could represent a multivariable controller, such as a HONEYWELL C300 controller. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

In accordance with this disclosure, properties of one or more of the Level 1 controllers 106 in the system 100 may be simulated and virtually configured prior to be installed in the system 100. For example, the controllers 106 may need to be preconfigured to correctly interpret data from the sensors 102a or correctly control the actuators 102b. Additional details regarding this functionality are provided below.

Although FIG. 1 illustrates one example of an industrial process control and automation system 100, various changes may be made to FIG. 1. For example, a control system could include any number of sensors, actuators, controllers, servers, operator stations, networks, and safety managers. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, while FIG. 1 illustrates one example environment in which a preconfigured Level 1 controller can be used, such a preconfigured Level 1 controller can be used in any other suitable device or system.

Over the course of time, the makeup of the system 100 is likely to change. For example, as certain components become outdated or obsolete, the obsolete components may be replaced with new components. Such new components may need to be configured in advance to operate successfully in the system 100. It is often advantageous to be able to perform configuration activities on components such as DCS equipment that has been ordered but not yet received. This is especially true for the Level 1 controllers, such as the controllers 106, which connect above to the Level 2 machine-level controllers 114, and below to the Level 0 sensors 102a and actuators 102b. For some kinds of equipment, software simulation of hardware functionality is not very difficult. However, for Level 1 controllers in particular, this is typically not an easy task due to the requirements of simulating the control strategies of the controller, and the behaviors of corresponding sensors, actuators, and the plant itself.

One method for creating a simulation of a Level 1 controller for configuration of the controller is to port the software from the real Level 1 controller and then add simulator tools to simulate the behavior of the sensors, actuators, and plant. However, this is typically very difficult to accomplish for a number of reasons. For example, the existing controller software code might be written in assembly language, the existing software code might be dependent on certain operating system functions, or the ported code might be dependent on certain task scheduling capabilities. In addition, some legacy controller properties are based on a design more than thirty years old and may predate current operating systems, such as MICROSOFT WINDOWS. Accordingly, it can be difficult to simulate these controller properties in newer environments.

To address these and other issues, embodiments of this disclosure provide a system and method for simulating or virtualizing a legacy Level 1 controller and its environment in order to configure the controller for a runtime environment. The disclosed simulation uses a number of advantageous and novel techniques. These techniques include unique source code translation, operating system emulation, and a custom scheduling algorithm, among others. Use of the disclosed simulation techniques provide a significant time and cost savings when configuring legacy Level 1 controllers.

Some older-design legacy Level 1 controllers include multiple processors, such as one processor for Level 1 communication, one processor for input/output (IO) communication, and one processor for control algorithm execution. One or more hardware/software interfaces enable inter-processor communication within the controller. Each of these processors might host an embedded operating system that manages and executes multiple operations and tasks. To address this, the disclosed embodiments feature an effective software port methodology that allows all of the legacy controller runtime components to be simulated under a single software process running on an advanced platform. The tasks that execute on separate operating systems hosted by different processors could be managed at different virtual priorities in the advanced platform.

Figure 2:
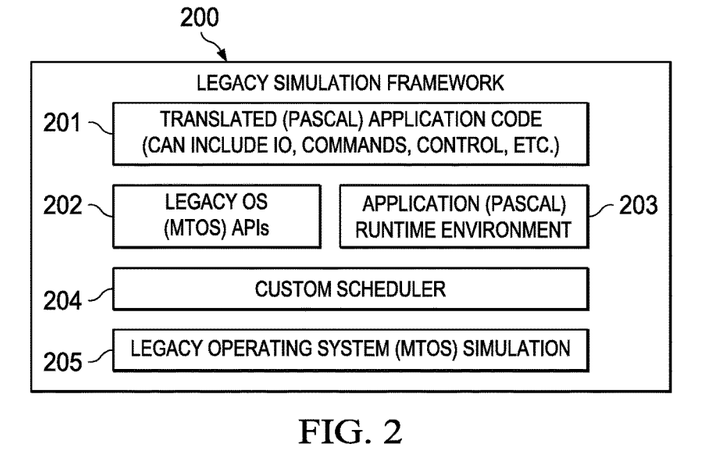
FIG. 2 illustrates a framework for virtualizing a legacy Level 1 controller in a distributed control system according to this disclosure.

FIG. 2 illustrates a framework 200 for virtualizing (or simulating) a legacy Level 1 controller in a distributed control system according to this disclosure. The framework 200 represents different components that are executed as different threads but together make up the simulation environment. The framework 200 includes translated application code 201, legacy operating system APIs 202, an application runtime environment 203, a custom scheduler 204, and additional components 205 for simulating the legacy operating system.

The translated application code 201 is source application code associated with the legacy Level 1 controller that has been translated from the operating system of the legacy controller to be executable in a modern operating system. For example, some legacy Level 1 controllers, such as a 'PM', 'APM', 'HPM', or 'EHPM' controller by HONEYWELL, use a 68040 processor by MOTOROLA and an older legacy operating system (e.g., 'MTOS') that is not compatible with the operating systems (e.g., MICROSOFT WINDOWS) commonly used by computing devices that have INTEL x86 (or equivalent) processors. The application code (e.g., software code written in Pascal or another high-level programming language) developed for the legacy Level 1 controller is therefore translated to be executable with an x86-based operating system. Throughout this document, an HPM controller is used as an example. However, it will be understood that references to HPM found in this document (including the drawings) are not intended to be limiting, and HPM can represent other legacy Level 1 controllers as well.

The application runtime environment 203 provides a runtime environment for executing the translated application code 201. In some embodiments, this can include a Pascal runtime environment.

The legacy operating system APIs 202 are APIs for the legacy operating system that were originally developed in 68040 assembly language but are replicated in the simulation system using C, Pascal, or another high-level programming language. The legacy operating system simulation components 205 are additional support functions that are employed to allow the virtualized legacy Level 1 controller to operate in the simulation system.

Together, the legacy operating system APIs 202 and the legacy operating system simulation components 205 support the translated application code 201 with a customized simulation of the legacy controller operating system (e.g., MTOS) that the legacy application would be expected to run in. The legacy operating system APIs 202 are emulated in an abstraction layer above the simulation system's operating system. The simulated legacy operating system allows all legacy software instructions (including IO (e.g., receive data, display data, etc.) and physical commands (e.g., turn on a switch, actuate a motor, etc.)) to correctly execute.

The custom scheduler 204 is a customized application that provides enhanced thread scheduling capabilities beyond those that the simulation system's operating system typically provides. For example, the legacy controller operating system MTOS includes thread scheduling that can handle a large number of specific priorities, which is something MICROSOFT WINDOWS, as an operating system, does not typically provide. The custom scheduler 204 provides support for these thread scheduling operations and other legacy IO commands that are not found in WINDOWS. The custom scheduler 204 can be generated by engineers or developers that are familiar with the legacy controller operating system. The custom scheduler 204 can be written in C or another high-level programming language.

Part of the operation of the simulation system includes performing address re-mapping to handle interactions with the legacy system hardware, and performing run time "endian" correction for all big-endian constants, all labels defined in the legacy (68040) source code, or any other items that require byte swapping.

The term "endian" refers to the convention used to store and interpret one or more bytes making up a data word or message when stored in computer memory. Each byte of data in memory has its own address. When reading or writing a data word containing multiple bytes, the order of the bytes stored in memory determines the interpretation of the data word.

Big-endian systems store the most significant byte of a data word in the smallest address and the least significant byte in the largest address. In contrast, little-endian systems store the least significant byte of a data word in the smallest address. When data is moved from a big-endian device or system to a little-endian device or system (or vice versa), the data needs to be converted to the appropriate "endianness," or the receiving device or system needs to account for the difference. This is referred to as endian correction.

The run time endian correction is achieved when the translated application code 201 is generated by including an endian correction function call at the end of each translated x86 assembly file. This function call launches an endian correction function for every item to be swapped in that file, and passes function parameters including the pointer to the memory location requiring the endian correction, data type info, and the size. The endian correction function then performs the byte swapping as needed. The endian correction function may be written in C or another suitable high-level programming language.

Further details regarding endian correction can be found in commonly-owned U.S. patent application Ser. No. 14/604,346, filed Jan. 23, 2015, the contents of which are incorporated herein by reference.

Although FIG. 2 illustrates one example of a framework 200 for virtualizing a legacy Level 1 controller in a distributed control system, various changes may be made to FIG. 2. For example, various components in FIG. 2 could be combined, further subdivided, or omitted and additional components could be added according to particular needs. Also, virtualization and simulation environments can come in a wide variety of configurations, and FIG. 2 does not limit this disclosure to any particular configuration.

Figure 3:
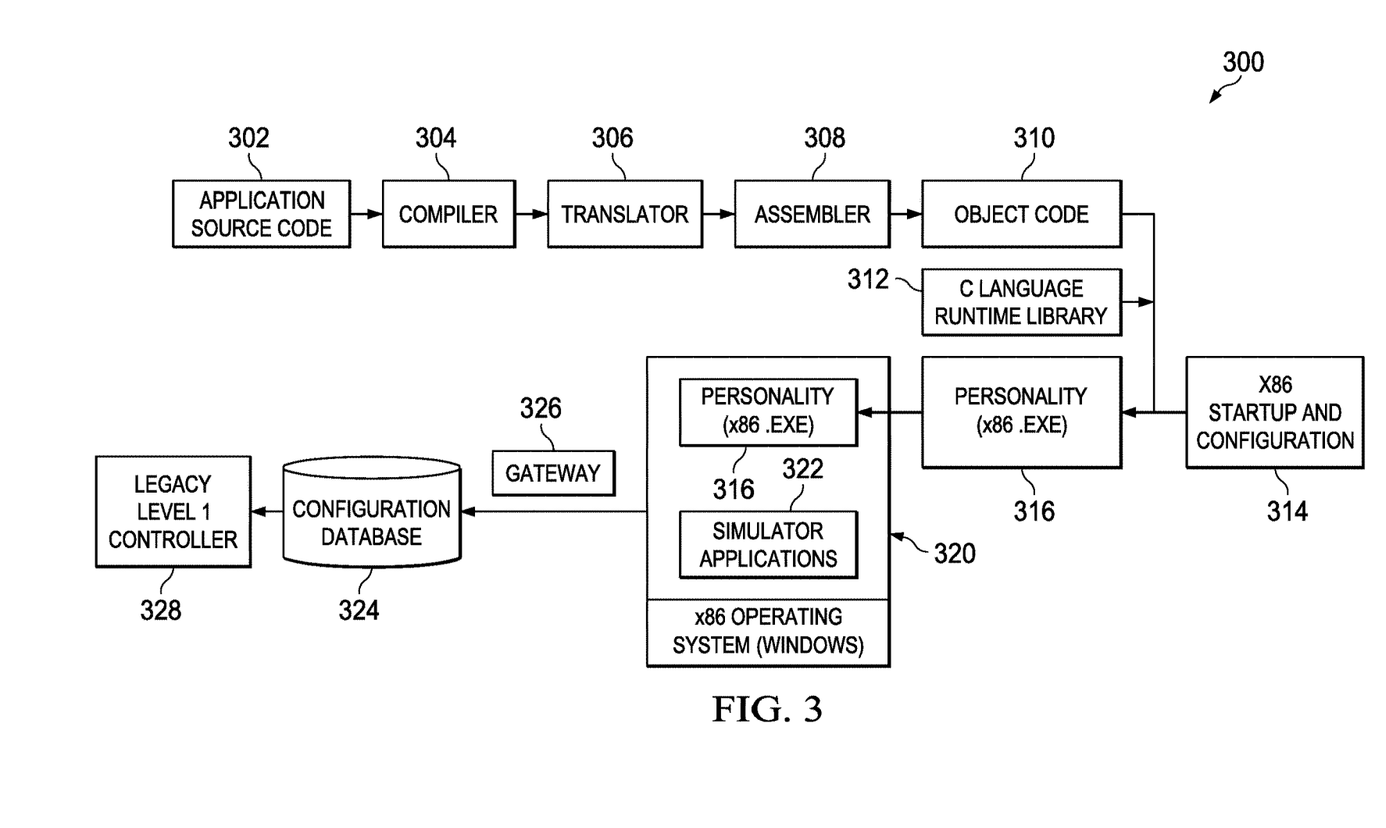
FIG. 3 illustrates an example system for virtualizing a legacy Level 1 controller in a distributed control system according to this disclosure.

FIG. 3 illustrates an example system 300 for virtualizing a legacy Level 1 controller in a distributed control system according to this disclosure. The system 300 could incorporate one, some, or all of the components of the framework 200 in order to configure a controller for use in the industrial process control and automation system 100.

As shown in FIG. 3, the system 300 includes one or more application source code files 302 for a legacy Level 1 controller that are written in a compilable, high-level programming language, such as Pascal or C. For example, the source code file(s) 302 can include instructions written in HONEYWELL Pascal for a software routine for a 68040 processor-based HPM controller. Each source code file 302 could include any suitable number of instructions in any suitable programming language.

A compiler 304 receives the source code file(s) 302 and compiles the instructions in each source code file 302 into machine-executable assembly language instructions. The assembly language instructions are compatible with a legacy controller processing device. For example, the assembly language instructions could be assembly code for a 68040 processor.

A translator 306 receives the assembly language instructions that are compatible with a legacy platform and translates the assembly language instructions to translated assembly language instructions that can be assembled for execution at a simulation device having an x86 processor, such as the simulator 320. That is, the translator 306 can translate instructions from 68040 assembly language to x86 assembly language. The translator 306 can be a customized assembly language translator or can be an existing assembly code translator that is part of a software migration tool, such as PortASM/68K translator by MICROAPL LTD.

An assembler 308 receives the translated assembly language instructions and assembles the instructions into object code 310. Once assembled, the object code 310 is executable by an x86-compatible computing device. The assembler 308 can represent any suitable assembler utility, including those that are specifically designed or customized for the system 300 or those that are existing and commercially available.

The object code 310 can be combined with a C language runtime library 312 and x86-based startup and configuration object code 314 into a personality file 316. The personality file 316 is an executable file associated with a personality of a legacy Level 1 controller. In this context, a personality is a type of profile that causes a hardware device to perform different functions or tasks. For example, a 'universal station' personality can represent software that governs a display, a keyboard, and a mouse. An 'application module' personality can represent software that governs loop control. Here, the personality of the legacy Level 1 controller is the simulation of the behavior of the legacy Level 1 controller in the distributed control system. The personality file 316 can include the functions of the legacy Level 1 controller and also functions associated with the controller's interface to its Level 2 supervisory node(s).

The simulator 320 is a general purpose computing device running an x86-based operating system, like WINDOWS. For example, the simulator 320 may be a desktop computer, a laptop computer, a notebook, a server, or any other suitable computing device. The personality file 316 is loaded into a memory of the simulator 320 for execution by the simulator 320. In addition to the personality file 316, the simulator 320 can host the software performing the functionality of the Level 2 supervisory node, and software to control a hardware interface used to connect the legacy Level 1 controller to the Level 2 network. These hardware/software components can be physically separate or can be on the same physical hardware, but are managed and executed as distinct logical entities.

During the simulation, the simulator 320 operates one or more simulator applications 322 to simulate and configure the virtualized legacy Level 1 controller embodied in the personality file 316. For example, the simulator applications 322 executed by the simulator 320 can include a legacy simulation manager utility, a simulator configuration utility, and a controller configuration utility. These are described in greater detail below. Using the simulator 320, the personality file 316, and the simulator applications 322, a user (e.g., a system engineer) can configure the virtual legacy Level 1 controller without the presence of an actual physical instance of the controller.

Once the simulation is complete and the virtual legacy Level 1 controller is correctly configured, the configuration data is saved in a configuration database 324 (or flat file or any other suitable data structure). The configuration database 324 can then be imported or loaded into the physical Level 1 controller 328 once the controller 328 is available.

A computer gateway 326 can be used to interface to the controller 328 and the corresponding legacy Level 2 supervisory network. The computer gateway 326 includes a hardware interface (e.g., a peripheral component interconnect (PCI) device) that connects to the Level 2 supervisory network, a device driver for the hardware interface, and one or more software components for enabling communication via the hardware interface. Using the computer gateway 326, the virtual legacy Level 1 controller can communicate with the legacy Level 2 supervisory network, thus making it possible to use the same user interface for configuration of a virtual legacy Level 1 controller and a physical controller.

The computer gateway 326 communicates with the Level 1 controller 328 using an IP protocol. The format of the data maintained by the computer gateway 326 and the level 1 software application is the same as that of the controller 328. This preserves the integrity of the database 324 across virtual and embedded level 1 controllers, thus allowing the database 324 generated at the simulator 320 to be imported into the real hardware. The computer gateway 326 can support multiple connections, which enables having interfaces to as many legacy level 1 controllers 328 as needed. The use of the computer gateway 326 to interface to the legacy level 1 controller 328 eliminates the low level communication components like LLC/bus specific communication handlers, which in turn reduces the architectural complexity of the virtual level 1 software.

Although FIG. 3 illustrates one example of a legacy Level 1 controller virtualization system 300, various changes may be made to FIG. 3. For example, various components in FIG. 3 could be combined, further subdivided, or omitted and additional components could be added according to particular needs. As a particular example, while shown as separate components, two or more of the compiler 304, the translator 306, the assembler 308, the simulator 320, and the gateway 326 could be combined in one device. Also, virtualization and simulation environments can come in a wide variety of configurations, and FIG. 3 does not limit this disclosure to any particular configuration.

Figure 4:
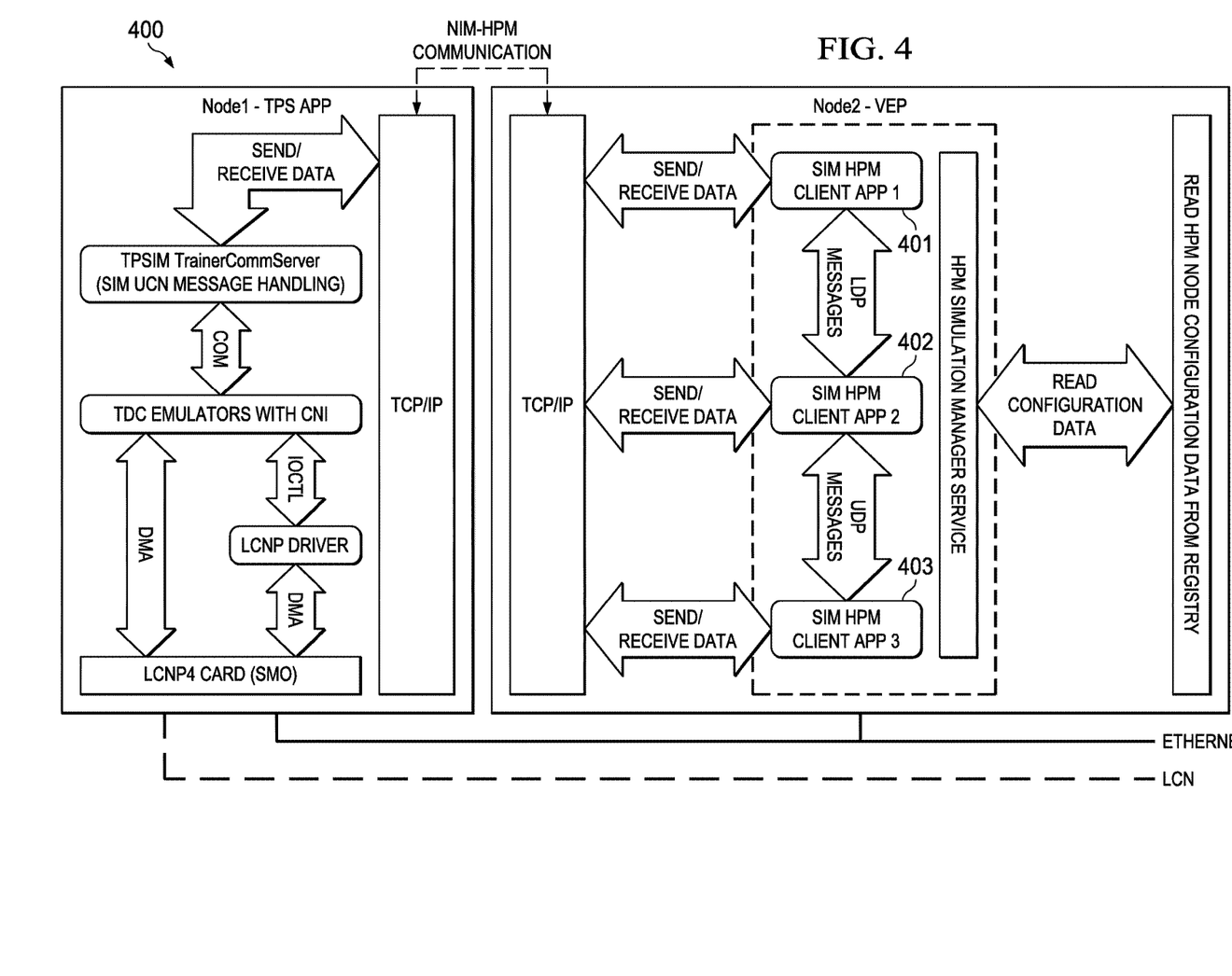
FIG. 4 illustrates different components of a legacy Level 1 controller virtualization system according to this disclosure.

FIG. 4 illustrates different components of a legacy Level 1 controller virtualization system 400 according to this disclosure. The legacy Level 1 controller virtualization system 400 could denote the legacy Level 1 controller virtualization system 300 according to this disclosure.

The system 400 in FIG. 4 is responsible for invoking and running multiple distinct instances of the simulation executable for different virtual controllers depending on the configuration. That is, each instance operates to simulate the functionality of one physical legacy Level 1 controller. The system 400 assigns and handles the individual virtual node instances. The system 400 reads the user-defined configuration, which includes inputs that are required to run an instance of the controller simulation. The system 400 launches as many instances as are configured. As shown in FIG. 4, Client APP 1 401, Client APP 2 402, and Client APP 3 403 represent different instances of the simulation with different configurations and different databases.

The system 400 supports the management of simulated HPM applications. Some of the tasks performed by the system 400 include:
  Startup of simulated legacy controllers (SIM HPMs) according to the configuration during service startup;
  Closing of all simulated legacy controllers during service stop; and
  Monitoring applications associated with the simulated legacy controllers.

Figure 5:
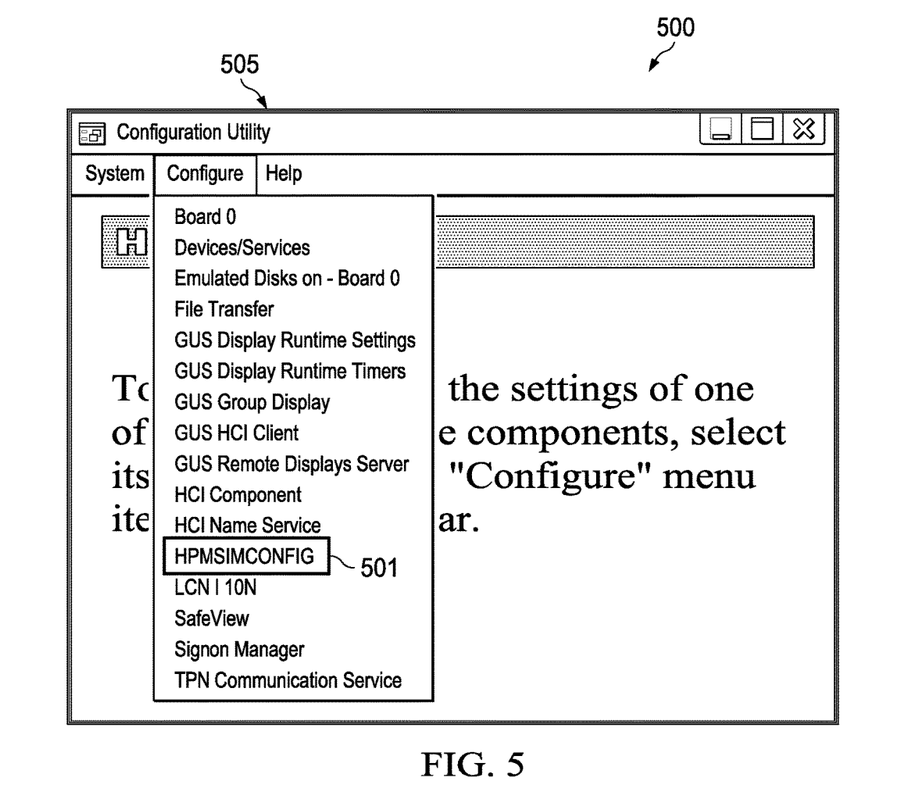
FIGS. 5 and 6 illustrate example screens from an operator station executing different components of a legacy Level 1 controller virtualization system according to this disclosure.
Figure 6:
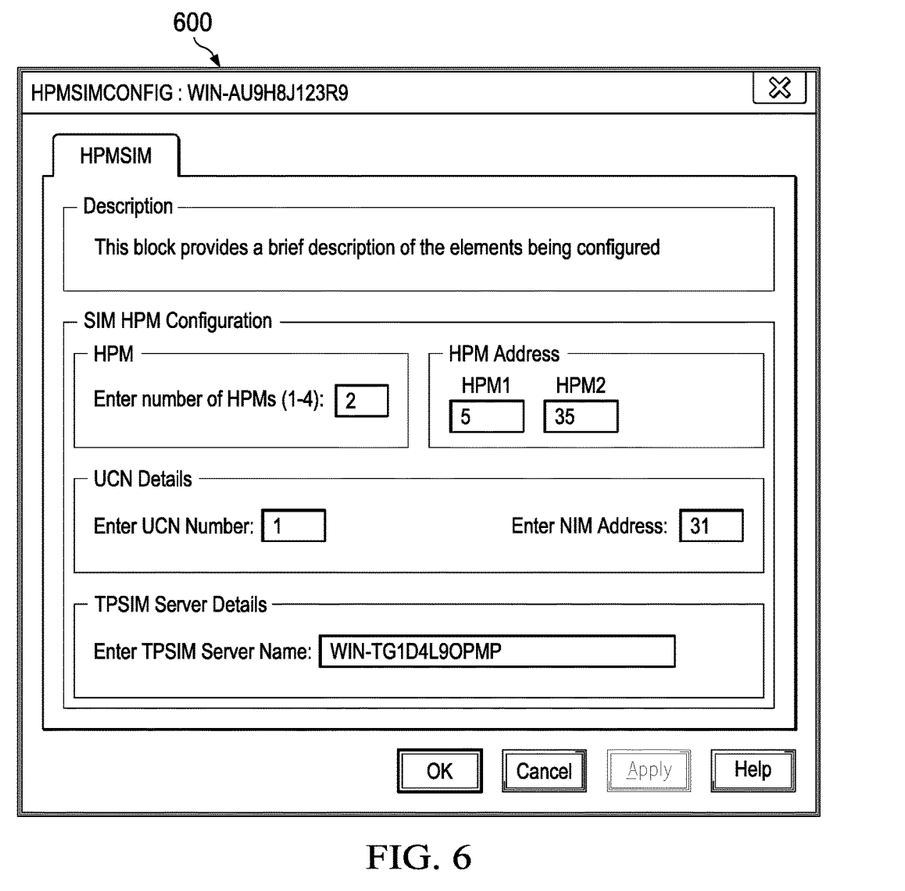

FIGS. 5 and 6 illustrate example screens from an operator station executing different components of a legacy Level 1 controller virtualization system according to this disclosure. The legacy Level 1 controller virtualization system could denote the legacy Level 1 controller virtualization system 300 according to this disclosure.

The screen 500 in FIG. 5 shows a display in a Simulator Configuration utility 505. The Simulator Configuration utility 505 can be used for configuring multiple Level 1 virtual controllers in the simulation environment. A new HPMSIM-CONFIG menu item 501 is added to the Simulator Configuration utility 505. Selection of the HPMSIMCONFIG menu item 501 launches the SIM HPM configuration window 605, which is shown in FIG. 6.

The screen 600 in FIG. 6 shows the SIM HPM configuration window 605, which allows a user to configure the number of simulated legacy controllers and related details for each instance. The SIM HPM configuration window 605 includes the following configurable options:
  Number of SIM HPMs
  HPM Node Address
  UCN Network Number
  NIM Address
  TPSIM Server Name
These configurable options make the identity of each simulated legacy controller unique in the legacy Level 1 controller virtualization system.

Although FIGS. 5 and 6 illustrate examples of screens from an operator station executing components of a legacy Level 1 controller virtualization system, various changes may be made to FIGS. 5 and 6. For example, the screens 500, 600 could be formatted differently and could display other types of information.

Figure 7:
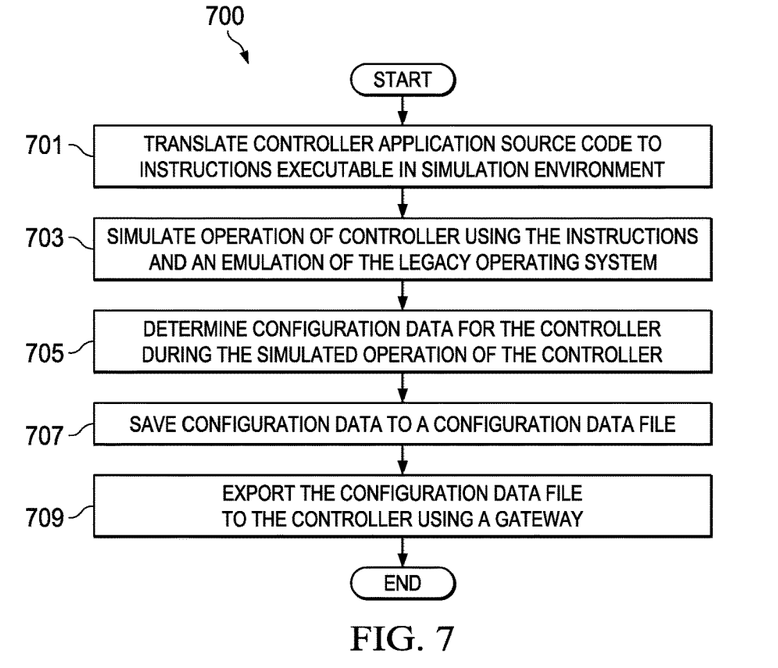
FIG. 7 illustrates an example method for virtualizing a legacy Level 1 controller in a distributed control system according to this disclosure.

FIG. 7 illustrates an example method 700 for virtualizing a legacy Level 1 controller in a distributed control system according to this disclosure. For ease of explanation, the method 700 is described as being performed using the system 300 of FIG. 3. However, the method 700 could be used with any suitable device or system.

At step 701, the system 300 translates at least one application source code file associated with a legacy controller in a distributed control system to instructions executable by a controller simulation computing device. The legacy controller is associated with a legacy operating system and the controller simulation computing device is associated with a second operating system different from the legacy operating system. This may include, for example, the compiler 304 compiling at least one application source code file 302, then the translator 306 translating the compiled code, and the assembler 308 assembling the translated code into object code 310. The object code 310 can be combined with the C language runtime library 312 and the x86-based startup and configuration object code 314 into the personality file 316.

At step 703, the system 300 simulates operation of the legacy controller using the instructions and an emulation of the legacy operating system in the controller simulation computing device. This may include, for example, the simulator 320 simulating the legacy controller using the personality file 316.

At step 705, the system 300 determines configuration data for the legacy controller during the simulated operation of the legacy controller. This may include, for example, the simulator 320 determining or calculating one or more configuration parameters for the legacy controller, or receiving one or more configuration parameters from a user.

At step 707, the system 300 saves the configuration data to a configuration data file. This may include, for example, the simulator 320 generating the configuration database 324.

At step 709, the system 300 exports the configuration data file to the legacy controller using a gateway. The gateway includes a hardware interface to the legacy controller. This may include, for example, the gateway 326 exporting the configuration database 324 to the legacy level 1 controller 328.

Although FIG. 7 illustrates one example of a method 700 for virtualizing a legacy Level 1 controller in a distributed control system, various changes may be made to FIG. 7. For example, while shown as a series of steps, various steps shown in FIG. 7 could overlap, occur in parallel, occur in a different order, or occur multiple times. Moreover, some steps could be combined or removed and additional steps could be added according to particular needs. In addition, while the method 700 is described with respect to the system 300, which was described with respect to an industrial process control and automation system, the method 700 may be used in conjunction with other types of devices and systems.

Figure 8:
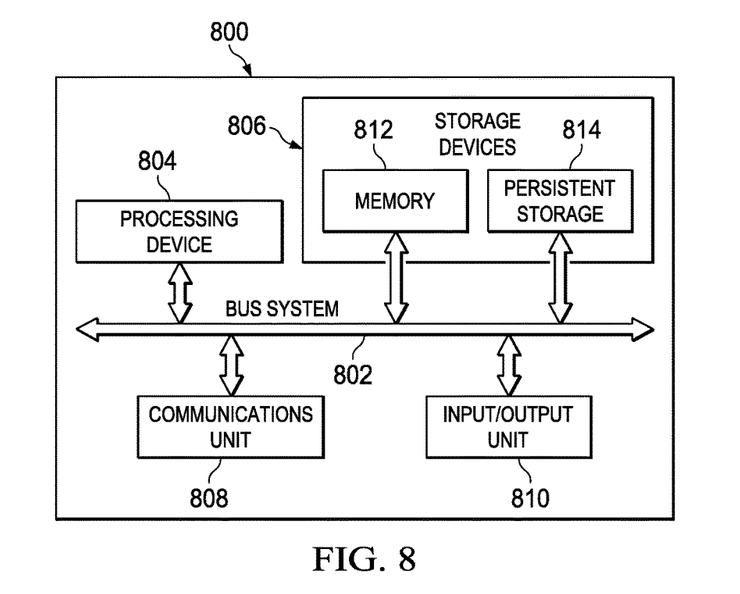
FIG. 8 illustrates an example device for performing virtualization of a legacy Level 1 controller in a distributed control system according to this disclosure.

FIG. 8 illustrates an example device 800 for performing virtualization of a legacy Level 1 controller in a distributed control system according to this disclosure. The device 800 could, for example, represent a computing device in the system 300 of FIG. 3, such as the simulator 320 or the gateway 326. The device 800 could represent any other suitable device for performing virtualization of a legacy Level 1 controller in a distributed control system.

As shown in FIG. 8, the device 800 can include a bus system 802, which supports communication between at least one processing device 804, at least one storage device 806, at least one communications unit 808, and at least one input/output (I/O) unit 810. The processing device 804 executes instructions that may be loaded into a memory 812. The processing device 804 may include any suitable number(s) and type(s) of processors or other devices in any suitable arrangement. Example types of processing devices 804 include microprocessors, microcontrollers, digital signal processors, field programmable gate arrays, application specific integrated circuits, and discrete circuitry.

The memory 812 and a persistent storage 814 are examples of storage devices 806, which represent any structure(s) capable of storing and facilitating retrieval of information (such as data, program code, and/or other suitable information on a temporary or permanent basis). The memory 812 may represent a random access memory or any other suitable volatile or non-volatile storage device(s). The persistent storage 814 may contain one or more components or devices supporting longer-term storage of data, such as a ready only memory, hard drive, Flash memory, or optical disc. In accordance with this disclosure, the memory 812 and the persistent storage 814 may be configured to store instructions associated with facilitating dynamic remapping of absolute addresses during a software migration.

The communications unit 808 supports communications with other systems, devices, or networks, such as the networks 110-120. For example, the communications unit 808 could include a network interface that facilitates communications over at least one Ethernet network. The communications unit 808 could also include a wireless transceiver facilitating communications over at least one wireless network. The communications unit 808 may support communications through any suitable physical or wireless communication link(s).

The I/O unit 810 allows for input and output of data. For example, the I/O unit 810 may provide a connection for user input through a keyboard, mouse, keypad, touchscreen, or other suitable input device. The I/O unit 810 may also send output to a display, printer, or other suitable output device.

Although FIG. 8 illustrates one example of a device 800 for performing virtualization of a legacy Level 1 controller in a distributed control system, various changes may be made to FIG. 8. For example, various components in FIG. 8 could be combined, further subdivided, or omitted and additional components could be added according to particular needs. Also, computing devices can come in a wide variety of configurations, and FIG. 8 does not limit this disclosure to any particular configuration of device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for virtualization of a legacy controller in a distributed control system, the method comprising:
   translating at least one application source code file associated with the legacy controller to instructions executable by a controller simulation computing device, wherein the legacy controller is associated with a legacy operating system and the controller simulation computing device is associated with a second operating system different from the legacy operating system, wherein the translating comprises:
      compiling the at least one application source code file into first assembly language instructions compatible with the legacy operating system;
      translating the first assembly language instructions into second assembly language instructions compatible with the second operating system and adding an endian correction function call to the second assembly language instructions, the endian correction function call for calling a run-time endian correction function during simulation of the legacy controller; and
      assembling the second assembly language instructions into object code instructions compatible with the second operating system;
   simulating operation of the legacy controller using the object code instructions and an emulation of the legacy operating system in the controller simulation computing device;
   determining configuration data for the legacy controller during the simulated operation of the legacy controller;
   saving the configuration data to a configuration data file; and
   exporting the configuration data file to the legacy controller using a gateway, the gateway comprising a hardware interface to the legacy controller.

2. The method of claim 1, wherein simulating the operation of the legacy controller further comprises:
   performing endian correction on one or more big-endian constants from the at least one application source code file using the run-time endian correction function.

3. The method of claim 1, wherein the instructions and the emulation of the legacy operating system are executed as different threads in the controller simulation computing device.

4. The method of claim 1, wherein the legacy operating system is emulated in an abstraction layer above the second operating system in the controller simulation computing device.

5. The method of claim 1, wherein simulating the operation of the legacy controller further comprises using a custom scheduler that provides one or more thread scheduling functions compatible with the legacy operating system.

6. An apparatus for virtualization of a legacy controller in a distributed control system comprising:
   at least one memory configured to store data; and
   at least one processing device configured to:
      translate at least one application source code file associated with the legacy controller to instructions executable by the apparatus, wherein the legacy controller is associated with a legacy operating system and the apparatus is associated with a second operating system different from the legacy operating system, wherein to translate, the at least one processing device is configured to:
         compile the at least one application source code file into first assembly language instructions compatible with the legacy operating system;
         translate the first assembly language instructions into second assembly language instructions compatible with the second operating system and add an endian correction function call to the second assembly language instructions, the endian correction function call for calling a run-time endian correction function during simulation of the legacy controller; and
         assemble the second assembly language instructions into object code instructions compatible with the second operating system;
      simulate operation of the legacy controller using the object code instructions and an emulation of the legacy operating system;
      determine configuration data for the legacy controller during the simulated operation of the legacy controller; and
      save the configuration data to a configuration data file stored in the at least one memory; and
   a gateway configured to export the configuration data file to the legacy controller, the gateway comprising a hardware interface to the legacy controller.

7. The apparatus of claim 6, wherein to simulate the operation of the legacy controller, the at least one processing device is further configured to:
   perform endian correction on one or more big-endian constants from the at least one application source code file using the run-time endian correction function.

8. The apparatus of claim 6, wherein the at least one processing device is configured to execute the instructions and the emulation of the legacy operating system as different threads in the apparatus.

9. The apparatus of claim 6, wherein the legacy operating system is emulated in an abstraction layer above the second operating system in the apparatus.

10. The apparatus of claim 6, wherein the at least one processing device is further configured to simulate the operation of the legacy controller using a custom scheduler that provides one or more thread scheduling functions compatible with the legacy operating system.

11. A non-transitory computer readable medium for virtualization of a legacy controller in a distributed control system, the non-transitory computer readable medium containing instructions that, when executed by at least one processing device, cause the at least one processing device to:
   translate at least one application source code file associated with the legacy controller to controller to controller instructions executable by the at least one processing device, wherein the legacy controller is associated with a legacy operating system and the at least one processing device is associated with a second operating system different from the legacy operating system, wherein the instructions to translate comprise instructions to:
compile the at least one application source code file into first assembly language instructions compatible with the legacy operating system;
translate the first assembly language instructions into second assembly language instructions compatible with the second operating system and add an endian correction function call to the second assembly language instructions, the endian correction function call for calling a run-time endian correction function during simulation of the legacy controller; and
assemble the second assembly language instructions into object code instructions compatible with the second operating system;
simulate operation of the legacy controller using the controller instructions and an emulation of the legacy operating system in the at least one processing device;
determine configuration data for the legacy controller during the simulated operation of the legacy controller;
save the configuration data to a configuration data file; and
export the configuration data file to the legacy controller using a gateway, the gateway comprising a hardware interface to the legacy controller.

12. The non-transitory computer readable medium of claim 11, wherein the instructions that, when executed by at least one processing device, cause the at least one processing device to simulate the operation of the legacy controller further comprise instructions that, when executed by at least one processing device, cause the at least one processing device to:
perform endian correction on one or more big-endian constants from the at least one application source code file using the run-time endian correction function.

13. The non-transitory computer readable medium of claim 11, wherein the controller instructions and the emulation of the legacy operating system are executed as different threads by the at least one processing device.

14. The non-transitory computer readable medium of claim 11, wherein the legacy operating system is emulated in an abstraction layer above the second operating system.

15. The non-transitory computer readable medium of claim 11, wherein the instructions that, when executed by at least one processing device, cause the at least one processing device to simulate the operation of the legacy controller further comprise instructions that, when executed by at least one processing device, cause the at least one processing device to use a custom scheduler that provides one or more thread scheduling functions compatible with the legacy operating system.

16. The method of claim 1, wherein the legacy operating system comprises an operating system compatible with a MOTOROLA 68040 processor.

17. The method of claim 1, wherein the at least one application source code file is written in Pascal or C.

18. The apparatus of claim 6, wherein the legacy operating system comprises an operating system compatible with a MOTOROLA 68040 processor.

19. The apparatus of claim 6, wherein the at least one application source code file is written in Pascal or C.

20. The non-transitory computer readable medium of claim 11, wherein the legacy operating system comprises an operating system compatible with a MOTOROLA 68040 processor.

* * * * *